Figure 1:
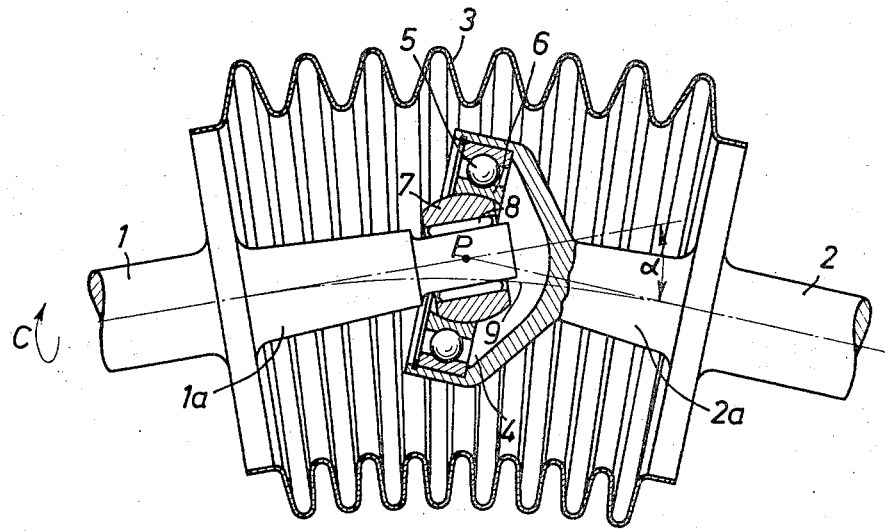

United States Patent [19]

Orain

[11] 3,792,597
[45] Feb. 19, 1974

[54] RADIAL CENTERING DEVICE FOR HIGH SPEED TRANSMISSION COUPLINGS
[75] Inventor: Michel Orain, Conflans Sainte-Honorine, France
[73] Assignee: Societe Anonyme: Glaenzer Spicer, Poissy, France
[22] Filed: Nov. 15, 1971
[21] Appl. No.: 198,734

[30] Foreign Application Priority Data
Nov. 24, 1970  France ............................. 7042175

[52] U.S. Cl. ..................... 64/7, 64/8, 64/11 B, 287/87
[51] Int. Cl. .............................................. F16d 3/16
[58] Field of Search ........ 64/8, 7, 11 B, 21; 287/87, 287/88; 308/72

[56] References Cited
UNITED STATES PATENTS
3,162,471  12/1964  Mazziotti ............................ 287/87

2,206,291  7/1940  Nelson ..................... 64/21
3,621,674  11/1971  Ulics et al. .............. 64/11 B
3,628,290  12/1971  Wilson ..................... 64/21

FOREIGN PATENTS OR APPLICATIONS
698,945  11/1940  Germany ................. 64/21

Primary Examiner—Benjamin W. Wyche
Assistant Examiner—Randall Heald
Attorney, Agent, or Firm—Baldwin, Wight & Brown

[57] ABSTRACT

A radial centering device for high speed transmission couplings of the type having a ball-and-socket joint. The ball is disposed at the end of an extension of a first shaft and the socket is disposed at the end of an extension of a second shaft. A first bearing is interposed between the needle or roller and the extension of the first shaft and a second bearing is interposed between the socket and the extension of the second shaft. The ball sliding relative to the shaft on during a change of the operating between the two shafts.

7 Claims, 2 Drawing Figures

PATENTED FEB 19 1974   3,792,597

RADIAL CENTERING DEVICE FOR HIGH SPEED TRANSMISSION COUPLINGS

The present invention concerns a mechanical device for ensuring a fixed point of convergence of the axes of two shafts having a fixed or variable angle therebetween and connected together by a homokinetic transmission coupling which itself is not centred, such a double universal joint, the device being particularly suited for the transmission of high rotational speeds.

It is known that homokinetic universal joints commonly used in the automobile industry are formed of the combination of two simple universal joints held in phase and a ball-and-socket connecting assembly for the two shafts such that the two universal joints operate at the same angle. Thus connected up, the homokinetic defects of each universal joint is canceled out by the other.

But for applications in which a high speed is required, the oscillatory movement of the ball-and-socket joint is also very great and as the load exerted on the ball-and-socket joint is significant, heating up of the ball-and-socket joint and an insufficient industrial life have been observed.

Indeed, if N is the rotational speed of the coupling, $r$ the radius of the ball and $\alpha$ the operating angle of the coupling, the maximum sliding speed of the ball is:

$$v = 2Nr \sin \alpha/2$$

The present invention consists in a radial centring device in a homokinetic coupling operating at high speeds for eliminating the sliding of the central ball at a predetermined operating angle, the sliding movement of the ball only occurs during a change of the angle between the shafts to be connected.

The radial centring device comprises a ball-and-socket joint connecting the ends of extensions on shafts to be connected, the pivoting is effected in ball bearings, roller bearings or needle bearings interposed between the socket of the ball-and-socket joint and the extension of the corresponding shaft and between the ball of the ball-and-socket joint and the extension of the second shaft.

In an embodiment in which the rotational driving of the driven shaft by the driving shaft is ensured by a metal or plastics bellows and in which each of the shafts includes an extension one of which ending in a ball and the other in a socket for the ball, the ball being mounted by means of a roller bearing at the end of the first shaft whereas the spherical socket for the ball is constituted by the inner race of a ball bearing, the outer race of which being fixed to the socket at the end of the second shaft.

According to an alternative embodiment in which the rotational driving of a shaft by a second shaft is ensured by a double universal joint, the radial centring device comprises a ball fixed to a short shaft turning in two roller bearings housed in a bore formed in one of the two arms of the body of one of the universal joints whereas the spherical socket for receiving the ball is fixed to the other short shaft turning in ball bearings and a roller bearing housed in a bore formed in one of the arms of the body of the other universal joint.

Figure 2:
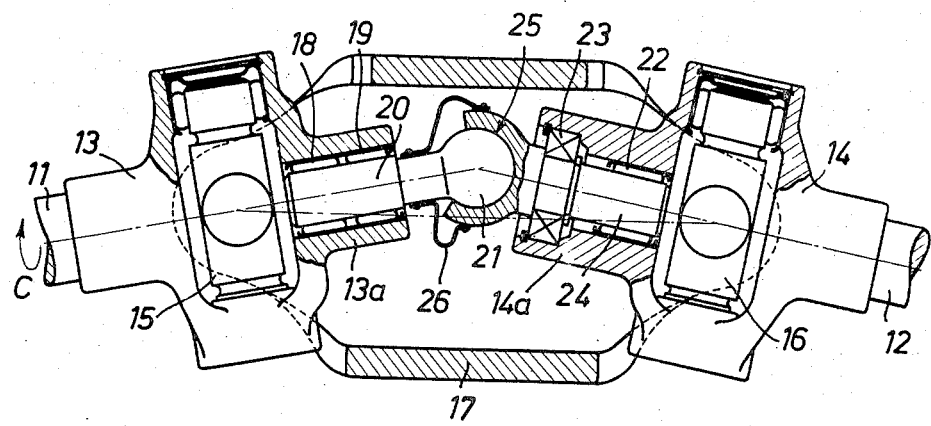

The invention is described in greater detail hereinafter with reference to the accompanying drawing, in which:

FIG. 1 shows a longitudinal section of a homokinetic coupling driven by a bellows; and FIG. 2 shows a longitudinal section of a homokinetic coupling driven by a double universal joint.

FIG. 1 shows an embodiment of the invention in which the radial centring device couples two shafts 1 and 2 with a coupling bellows 3, the shafts having extensions 1a and 2a extending towards the interior of the coupling.

The extension 2a includes a bore 4 in which a ball bearing 5 is fitted having an inner race 6 which is spherically bored and pivots about a ball 7 which may be of self-lubricating metal or plastics material.

The ball 7 has a needle bearing 8 mounted for rotation on the journal 9 forming the end of the extension 1a of the shaft 1.

When the shafts 1 and 2 of the coupling rotate at the angle $\alpha$ transmitting a torque C, the pivoted connection is subject to a significant radial load perpendicular to the plane of the angle of coupling, i.e. perpendicular to the plane of FIG. 1 and exerted at the centre P of the pivoted connection.

The result is that the combination comprising the inner race 6 of the ball bearing, the ball 7 and the outer race of the needle bearing 8 are fixed with respect to the two shafts, in other words there is no sliding movement of the ball relative to the socket during the rotation of the shafts of the coupling at an angle. The only movement causing the sliding of the ball 7 in the spherical bore of the race 6 is the change of the angle $\alpha$.

Thus, the heating and the wear of the pivoted ball-and-socket joint are avoided. Further, under these conditions the ball may be produced of resilient materials such as plastics or elastomeric materials which while eliminating play by a tight assembly enable the reduction of the transmission of high frequency vibrations which would otherwise pass from one shaft to the other across the coupling.

FIG. 2 shows another embodiment of the radial centring device used on a high speed homokinetic coupling with a double universal joint.

In this embodiment the shafts 11 and 12 are integral with bodies 13 and 14 respectively of two classic universal joints.

Cross pins 15 and 16 are placed in the bodies 13 and 14, the journals are in the conventional manner each provided with a bearing fitted in the bores in the bodies 13 and 14 and in a coupling sleeve 17 connecting the two bodies 13 and 14.

Each of the bodies 13 and 14 have hollow extensions 13a and 14a aligned with the shafts 11 and 12 respectively.

In the bore in the extension 13a two needle or roller bearings 18 and 19 are seated in which a short shaft 20 ending in a ball 21 may rotate.

In the bore in the extension 14a a roller bearing 22 and a ball bearing 23 are seated in which a short shaft 24 may rotate having at its end a socket 25 with a spherical cavity in which the ball 21 may oscillate.

A resilient sheath 26 connecting the shaft 20 to the shaft 24 enables a lubricant to be maintained in the ball-and-socket joint.

It should be noted that the female extensions 13a and 14a may be male extensions in order to guide from within the female end of the ball and the socket bearings.

It is quickly realized that roller bearings, needle bearings or ball bearings are off set in relation to the ball-and-socket joint and that this construction reduces bulkiness near the ball.

The embodiments described hereinabove are not intended to be limiting; the invention is also applicable to combinations of couplings and ball-and-socket joints, the two systems capable of being associated.

The invention is applicable to all mechanical arts and more particularly to automotive arts.

What we claim is:

1. A radial centring device for high speed transmission shaft couplings of the type having a ball-and-socket joint comprising an extension on each of the shafts to be coupled, a ball being disposed at the end of the extension on a first shaft and a socket being disposed at the end of an extension on a second shaft, and a first bearing being interposed between said ball and said extension on the first shaft and a second bearing being interposed between said socket and said extension on the second shaft, at least one of said bearings being a ball bearing.

2. A radial centring device for high speed transmission shaft couplings of the type having a ball-and-socket joint comprising an extension on each of the shafts to be coupled, a ball being disposed at the end of the extension on a first shaft and a socket being disposed at the end of an extension on a second shaft, and a first bearing being interposed between said ball and said extension on the first shaft and a second bearing being interposed between said socket and said extension on the second shaft, a bellows operatively connected between the first and second shafts for ensuring the rotation between said shafts, and a spherical socket for the ball being formed in an inner race of a ball bearing mounted in a support case at the end of the extension of the second shaft, the outer race of the ball bearing being fixed to the support case, and the ball being mounted on a bearing on the first shaft.

3. A radial centring device for high speed transmission shaft couplings of the type having a ball-and-socket joint comprising an extension on each of the shafts to be coupled, a ball being disposed at the end of the extension on a first shaft and a socket being disposed at the end of an extension on a second shaft, and a first bearing being interposed between said ball and said extension on the first shaft and a second bearing being interposed between said socket and said extension on the second shaft, the ball being formed integral with a first short shaft, said first short shaft being received in a sleeve in the body of a first universal joint forming an extension of the first shaft; and the socket being formed integral with a second short shaft, said second short shaft being received in a sleeve in the body of a second universal joint forming an extension of the second shaft.

4. A device according to claim 3, wherein two roller bearings are interposed between the first short shaft and said sleeve in the body of the first universal joint, and wherein a ball bearing and a roller bearing are interposed between said second short shaft and said sleeve in the body of the second universal joint.

5. A radial centring device for high speed transmission shaft couplings of the type having a ball-and-socket joint comprising an extension on each of the shafts to be coupled, a ball being disposed at the end of the extension on a first shaft and a socket being disposed at the end of an extension on a second shaft, and a first bearing being interposed between said ball and said extension on the first shaft and a second bearing being interposed between said socket and said extension on the second shaft, said ball being formed of a resilient material.

6. A radial centring device for high speed transmission shaft couplings of the type having a ball-and-socket joint comprising an extension on each of the shafts to be coupled, a ball being disposed at the end of the extension on a first shaft and a socket being disposed at the end of an extension on a second shaft, and a first bearing being interposed between said ball and said extension on the first shaft and a second bearing being interposed between said socket and said extension on the second shaft, said ball being formed of plastic.

7. In a radial centering device for high speed transmission shaft coupling of the type having a ball-and-socket joint and including an extension on each of the shafts to be coupled with there being a ball at the end of an extension of a first shaft and a cooperating socket at the end of an extension of a second shaft; the improvement residing in mounting means mounting said ball and socket for limited relative movement during the operation of said coupling, said mounting means including first bearing means mounting said ball for relative rotary movement with respect to said extension of said first shaft and second bearing means mounting said socket for relative rotary movement with respect to said extension of said second shaft, and at least one of said bearing means being a ball bearing.

* * * * *